United States Patent
Mennes et al.

(10) Patent No.: US 12,143,826 B2
(45) Date of Patent: Nov. 12, 2024

(54) PREDICTING A RADIO SPECTRUM USAGE

(71) Applicants: IMEC VZW, Leuven (BE); UNIVERSITEIT ANTWERPEN, Antwerp (BE)

(72) Inventors: Ruben Mennes, Schelle (BE); Steven Latré, Lokeren (BE)

(73) Assignees: IMEC VZW, Leuven (BE); UNIVERSITEIT ANTWERPEN, Antwerp (BE)

( * ) Notice: Subject to any disclaimer, the term of this patent is extended or adjusted under 35 U.S.C. 154(b) by 354 days.

(21) Appl. No.: 17/640,470

(22) PCT Filed: Aug. 28, 2020

(86) PCT No.: PCT/EP2020/074099
§ 371 (c)(1),
(2) Date: Mar. 4, 2022

(87) PCT Pub. No.: WO2021/043680
PCT Pub. Date: Mar. 11, 2021

(65) Prior Publication Data
US 2022/0369115 A1    Nov. 17, 2022

(30) Foreign Application Priority Data
Sep. 6, 2019  (EP) .................................... 19195815

(51) Int. Cl.
*H04W 16/10* (2009.01)
*H04L 41/147* (2022.01)
(Continued)

(52) U.S. Cl.
CPC ........... *H04W 16/10* (2013.01); *H04L 41/147* (2013.01); *H04L 41/16* (2013.01); *H04W 16/14* (2013.01); *H04W 24/02* (2013.01)

(58) Field of Classification Search
None
See application file for complete search history.

(56) References Cited

U.S. PATENT DOCUMENTS

| 10,147,442 B1 | 12/2018 | Panchapagesan et al. |
| 2015/0365932 A1 | 12/2015 | Keerthi |

(Continued)

OTHER PUBLICATIONS

Extended Search Report from corresponding European Application No. 19195815.6, Feb. 21, 2020.

(Continued)

*Primary Examiner* — Minh Trang T Nguyen
(74) *Attorney, Agent, or Firm* — Workman Nydegger (57) ABSTRACT

A computer implemented method predicts by a neural network a radio spectrum usage in an environment comprising interferers and a plurality of wireless nodes. The nodes operate via a slotted medium access control, MAC, protocol within a radio spectrum. The method includes the following steps: obtaining per slot the radio spectrum usage by sensing the radio spectrum, labelling the slots as usable when a respective radio spectrum usage is lower than a predefined noise threshold or when a node successfully transmitted a packet through it, unusable when it is not usable and suitable to receive a packet, and calculating a loss function as a cross entropy loss with the usable and unusable slots over a total number of usable and unusable slots, and training the neural network by minimizing the loss function.

11 Claims, 10 Drawing Sheets

(51) Int. Cl.
*H04L 41/16* (2022.01)
*H04W 16/14* (2009.01)
*H04W 24/02* (2009.01)

(56) References Cited

U.S. PATENT DOCUMENTS

2018/0324595 A1 11/2018 Shima
2021/0004439 A1* 1/2021 Xiong .................. G06F 40/284
2022/0094464 A1* 3/2022 Olivés ...................... G06N 3/08

OTHER PUBLICATIONS

International Search Report and Written Opinion from PCT Application No. PCT/EP2020/074099, Nov. 3, 2020.

* cited by examiner

PREDICTING A RADIO SPECTRUM USAGE

FIELD OF THE INVENTION

The present invention generally relates to the field of predicting the usage of a radio spectrum in an environment comprising interferers.

BACKGROUND OF THE INVENTION

The wireless spectrum is becoming an important resource for a lot of today's devices. More and more devices are connected to the internet via wireless radios and transporting more and more data with a lot of different wireless network technologies. Most of these technologies are still using the industrial, scientific and medical, ISM, radio band and spectrum scarcity is one of the most important challenges now and in the future.

Today's existing collision avoidance techniques either apply a random back-off when spectrum collision is detected or assume that knowledge about other nodes spectrum occupation is known. These approaches are a very good solution to optimise inter-network spectrum usage but fail if the overall spectrum usage and throughput of all neighbouring wireless networks is optimised.

Since most of the existing algorithms optimize their own network performance, and since a number of different technologies that use the same ISM bands is also growing, the algorithms compete each other resulting in an overall deterioration of all the networks. Besides the other wireless networks, the environment may also comprise interferers, such as microwaves, which influence the overall performance, although they are not controllable.

It is therefore an object of the present invention to alleviate to above drawback and to provide an improved solution for predicting a spectrum usage in environment comprising one or more wireless networks and one or more interferers.

SUMMARY OF THE INVENTION

This object is achieved, in a first aspect, by a computer-implemented method for predicting by a neural network a radio spectrum usage in an environment comprising interferers and a plurality of wireless nodes, the nodes operating via a slotted medium access control, MAC, protocol within a radio spectrum, the method comprising the following steps:
  obtaining per slot the radio spectrum usage by sensing the radio spectrum;
  labelling the slots as:
    usable when a respective radio spectrum usage is lower than a predefined noise threshold or when a node successfully transmitted a packet through it;
    unusable when it is not usable and suitable to receive a packet; and
  calculating a loss function as a cross entropy loss with the usable and unusable slots over a total number of usable and unusable slots; and
  training the neural network by minimizing the loss function.

The environment comprises a plurality of wireless nodes which are configured to communicate with each other thereby constituting a wireless network. Within the environment interferers are present as well. These interferers are, for example, other wireless nodes from another wireless network. The interferers may further be devices that emits radio signals within a frequency range that interfere with that of the wireless network. An example of such a device is a microwave. The set of unknown networks and/or other sources may further be nominated as an interfering networks cluster, INC.

Within the environment, a diversity of technologies is thus present, having a wide variety of different applications. Furthermore, the nodes may be mobile as well, which makes the environment very dynamic.

The wireless nodes and the interferers share a radio spectrum, or at least have an overlap of a range of the radio spectrum used by the wireless nodes. These wireless nodes use the radio spectrum to operate, this is, exchanging data and/or data packets. To exchange the data packets, the wireless nodes are configured to operate via a slotted MAC protocol. This is done by a scheduler technique, which may be centralised or decentralised.

The slotted MAC protocol is, for example, a time division multiple access, TDMA, protocol, a multiple frequencies time division multiple access, MF-TDMA protocol, or a slotted carrier sense multiple access, CSMA, protocol.

The nodes may have access to one channel or to a number of channels operating within the radio spectrum. Through the channels time slots are available for exchanging the data packets. The time slots may be grouped in a superframe or in a created window of slots. It should be further understood that the grouping of the slots is dependent on the used protocol. Since the nodes operate through a slotted MAC protocol in their own network, every node may execute an action at the same time compared to the other nodes in the network. An action may, for example, be receiving or transmitting a data packet.

The receiving and transmitting of a data packet is performed through a slot. Since the network comprises the INC, slots may already be occupied through one or more of the devices in the INC and thus not available for the nodes. Furthermore, the technology used by devices of the INC is unknown.

Thus, as a first step, per slot the radio spectrum usage is obtained by sensing the radio spectrum. The sensing is, for example, performed by hardware radio technologies or by a software defined radio, SDR, platform. Through the sensing, energy is measured over the radio spectrum. Per channel over the radio spectrum the energy is sensed thereby obtaining per slot an energy level.

Next, since the nodes themselves also use the slots to transmit data packets, the energy sensed may originate from one or more of these nodes. To make a distinction between energy sensed from the INC or from one or more of the nodes, the nodes are configured to identify if a current slot is allocated inside the network. In MF-TDMA protocols such information is known by the nodes and for CSMA protocols this may be implemented by use of Request-to-Send/Clear-to-Send, RTS/CTS, strategies.

Next, since a distinction may be made between either sensed energy of the INC or energy originating from the nodes itself, the slots may be labelled as usable when a respective radio spectrum usage is lower than a predefined threshold or when the slot was used by one of the nodes for successfully transmitting a packet. In other words, when the energy level is low, the slot may be used by the network since the INC doesn't interfere with it. Secondly, when it was already successfully used for transmitting, it remains usable.

Other slots may be labelled as unusable when it is not labelled as usable but suitable to receive a packet.

In the occurrence that they are slots left that aren't labelled as usable or non-usable, these remaining slots may be labelled as unknown, or even not labelled at all and further be ignored.

Then with the usable and unusable slots a loss function as a cross entropy loss over a total number of usable and unusable slots is calculated.

Finally, the neural network configured to predict the radio spectrum usage in the environment is trained by minimizing the loss function.

Different advantages may be identified. Firstly, it is enabled to learn in an unknown environment by predicting the spectrum usage at every node for the upcoming slots. Secondly, by the loss function, it is possible to optimise the prediction based on partially observable data. This makes the prediction robust against unknown behaviour and new scenarios. Thirdly, through the prediction collisions are avoided with other sources or interferers.

According to an embodiment, the computer implemented method further comprises the step of optimizing layers of the neural network.

The optimizing may, for example, be performed through backpropagation, Tabu search, and/or simulated annealing.

The optimizing may further be performed by a swish optimization function. The swish activation function is a smooth, non-monotonic function defined as $f(x)=x.\sigma(x)$ where $\sigma(x)=(1+\exp(-x))^{-1}$ is the sigmoid function. By using a Swish activation function, the accuracy is increased compared to traditional rectified linear unit, ReLU, activation functions.

According to an embodiment, the optimizing further comprises optimizing an output layer of the neural network by a softmax activation.

In other words, a swish activation function on each layers of the neural network is used except for the last output layer. For the output layer a softmax activation is applied. This way, the output may be normalized into a probability distribution comprising a number of probabilities proportional to the exponentials of the input numbers.

According to an embodiment, the computer implemented method further comprises the step of predicting by a neural network an upcoming radio spectrum usage of the interferers.

When the neural network is trained, it becomes suitable for predicting an upcoming radio spectrum usage of the interferers, thus the devices of the INC.

According to a second aspect, the disclosure relates to a neural network according to the first aspect.

The neural network may, for example, be trained in the environment, or in an environment which is set up as simulates a representative environment wherein the neural network will be used.

According to a third aspect, the disclosure relates to a data processing system comprising means for carrying out the method according to the first aspect.

According to a fourth aspect, the disclosure relates to a computer program product comprising computer-executable instructions for performing the method according to the first aspect when the program is run on a computer.

According to a fifth aspect, the disclosure relates to a computer readable storage medium comprising the computer program product according to the fourth aspect.

According to a sixth aspect, the disclosure relates to a node for operating in a wireless network configured to predict a radio spectrum usage in an environment by the computer-implemented method according to the first aspect.

BRIEF DESCRIPTION OF THE DRAWINGS

Some example embodiments will now be described with reference to the accompanying drawings.

DETAILED DESCRIPTION OF EMBODIMENT(S)

Figure 1:
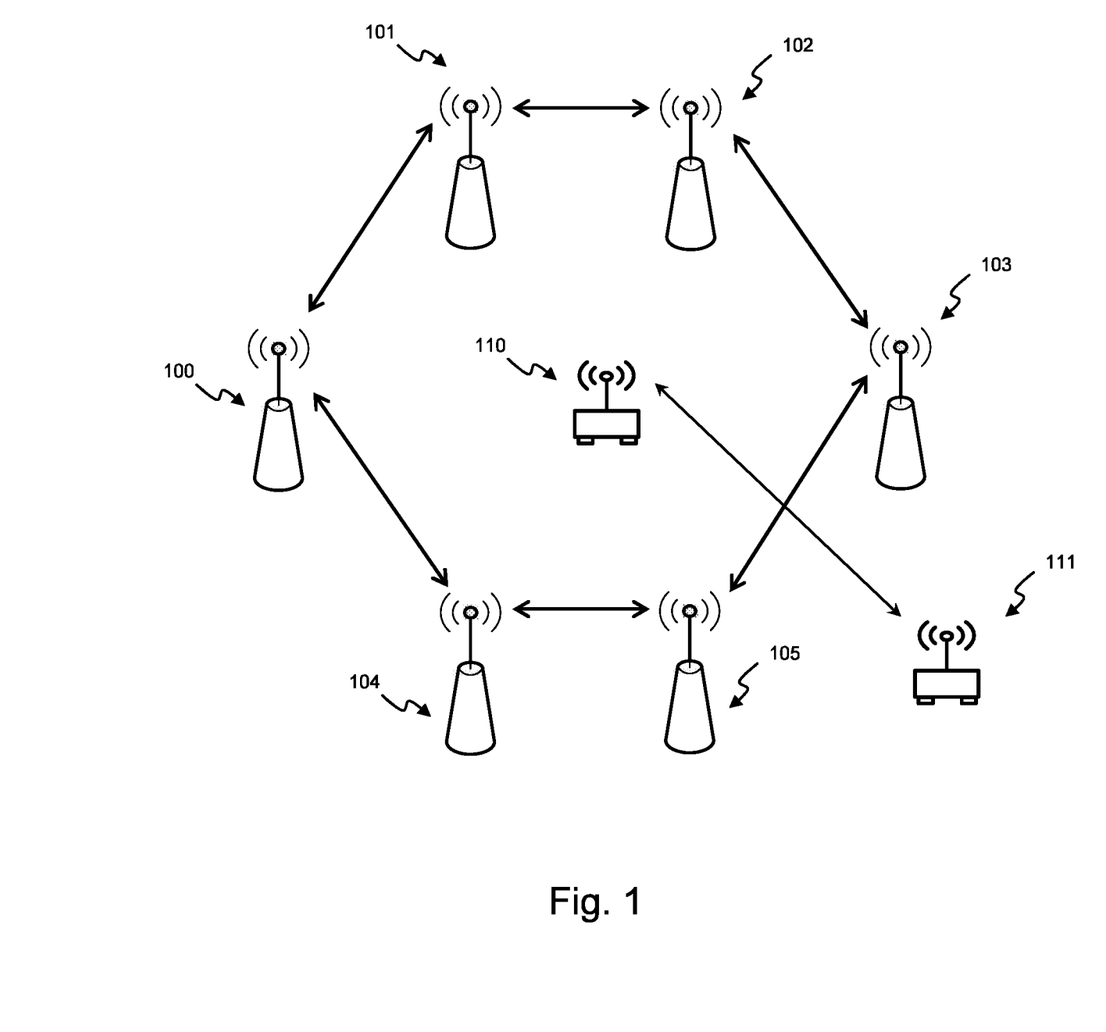
FIG. 1 shows an example embodiment of a ring topology of a network with a known and an unknown network.
Figure 2:
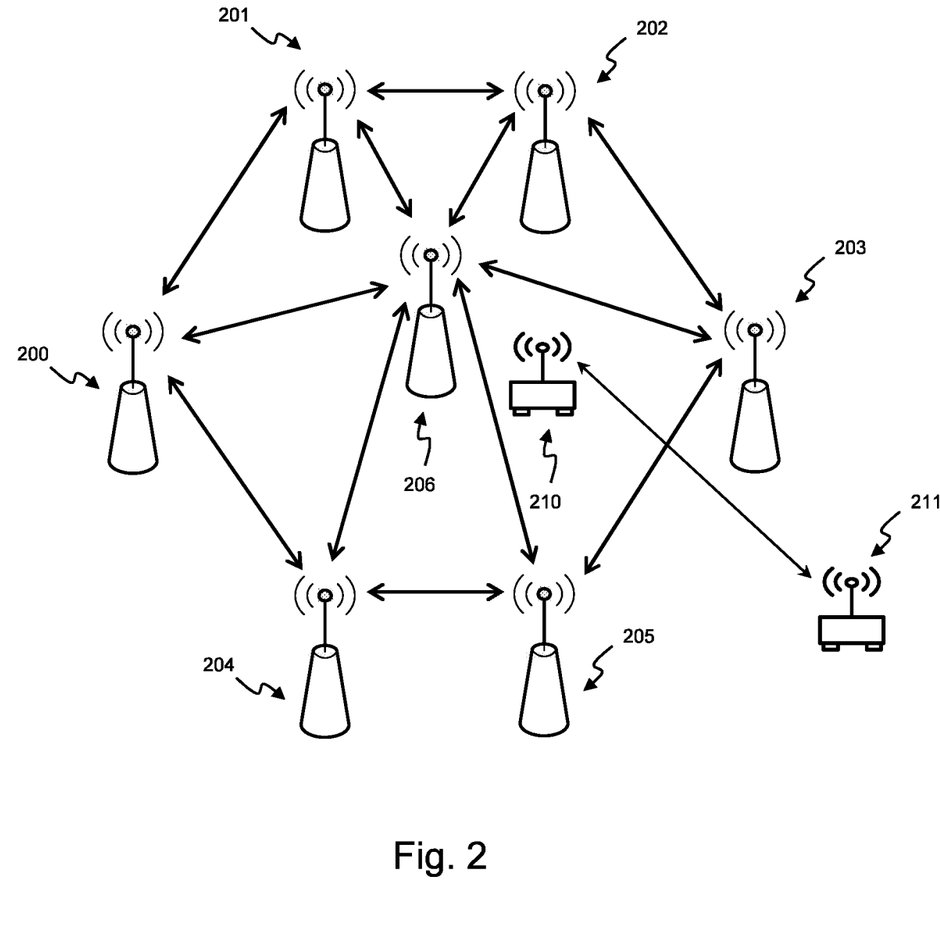
FIG. 2 shows another example embodiment of an access point, AP, topology of a network with a known and an unknown network.

In FIG. 1 a ring topology of a network is illustrated. The topology comprises a known network comprising nodes 100-105 which are configured to communicate with each other. The topology further comprises a second unknown network comprising nodes 110-11 which are likewise configured to communicate with each other, but not with the other nodes 100-105. In FIG. 2 another topology is illustrated. The topology comprises nodes 200-206 arranged in an access point, AP, topology. The other nodes 210-211 illustrate a second unknown network. The nodes 110-111 and 210-211 illustrate an interfering networks cluster, INC. The INC interferers with the network of nodes 100-105 respectively nodes 200-206. Thus, a known network comprises a number of known nodes N, representing the own network, and at least a second unknown set of networks, the INC. The INC may comprise noise from other sources, for example microwaves.

The nodes 100-105 respectively 200-206 of the own networks have access to C channels and use a slotted medium access control, MAC, protocol. The MAC protocol is, for example, a multiple frequencies time division multiple access, MF-TDMA, protocol, or a slotted random-access protocol. A superframe used in the slotted MAC protocol comprises S time slots. The superframe could thus be equal to the MF-TDMA superframe when using an MF-TDMA protocol, or it could be an artificial created window of S time slots if a slotted random-access protocol is used.

Further, t is defined as a global reference of time, wherein t is the number of slots executed after the start of the first radio in the environment. Since all the nodes 100-105 respectively 200-206 use a slotted MAC protocol, all the nodes 100-105 respectively 200-206 execute a slot at exactly the same time, because this is a general property of a slotted MAC protocol. A node n of the nodes 100-105 respectively 200-206 execute an action $A_{t,c}^n \in \{\text{Idle, TX, RX}\}$ at time t for every channel c. Furthermore, $TX_{t,c}^n$ and $RX_{t,c}^n$ are denoted as:

$$TX_{t,c}^n \begin{cases} 1 \text{ if } A_{t,c}^n = TX \\ 0 \text{ otherwise} \end{cases}, \quad \text{(Eq. 1)}$$

$$RX_{t,c}^n \begin{cases} 1 \text{ if } A_{t,c}^n = RX \\ 0 \text{ otherwise} \end{cases}. \quad \text{(Eq. 2)}$$

There are no constraints about the number of actions a node can execute at a certain time t. As long as they are executed on different channels. This is denoted as:

$$\forall n \in [1,N], \forall c \in [1,C], \forall t: TX_{t,c}^n + RX_{t,c}^n \leq 1 \quad \text{(Eq. 3)}.$$

Further, INC is completely unknown, thus there can be an unknown number of nodes in the INC, using an unknown protocol, or even noise generators could be part of the INC. For the INC $P_{t,c}$ is defined as the usage of channel c at time t by the INC, where $P_{t,c}=1$ if a source in the INC used channel c at time t, and $P_{t,c}=0$ otherwise. Due to the fact of fading, power control, modulation and coding scheme, MCS, setting, etc., the interference of a generated signal could be different for different nodes at different positions. Therefore, $P_{t,c}^n$ is defined as the usage of channel c at time t by the INC with energy above a predefined noise threshold in the interpretation of node n. Where $P_{t,c}^n=1$ if a source from the INC produces energy that is the interpretation of node n at time t on channel c is above the noise threshold.

To create a better and smarter use of the spectrum, the MAC protocol in the own network avoid collisions and for every transmission there is at least one node of the nodes 100-105 respectively 200-206 listening. This could, for example, be realised by a centralised MF-TDMA algorithm. Communication between the different nodes in the own network is successful if at a given time slot t at least one node is in a RX state and only received a message from one other node of the own network at a given channel c:

$$\forall c \in [1, C], \forall t: \sum_{n \in [1,N]} TX_{t,c}^n \leq 1. \quad \text{(Eq. 4)}$$

Thus, a communication of the own network at time t on channel c is successful if one own node is transmitting on channel c where the destination node will not have any influence of the INC. Parameter $y_{t,c}$ is used to determine if an own packet could be delivered successfully:

$$\gamma_{t,c} = \begin{cases} 1 \text{ if } \sum_{n \in [1,N]} TX_{t,c}^n = 1 \wedge \sum_{n \in [1,N]} RX_{t,c}^n(1 - P_{t,c}^n) = 0 \\ 0 \text{ otherwise} \end{cases}. \quad \text{(Eq. 5)}$$

Because the INC is unknown and since there is, from an external point of view, no way to know if a transmission interferers with a packet of the INC, it can be assumed that a communication in the INC is successful if $y'_{t,c}=1$, where:

$$\gamma'_{t,c} = \begin{cases} 1 \text{ if } \sum_{n \in [1,N]} TX_{t,c}^n = 0 \wedge P_{t,c}^n = 0 \\ 0 \text{ otherwise} \end{cases}. \quad \text{(Eq. 6)}$$

Further, the maximum network packet throughput, $\hat{\Gamma}$, is the sum of all successful transmissions:

$$\hat{\Gamma} = \sum_t \sum_{c \in [1,C]} \gamma_{t,c}. \quad \text{(Eq. 7)}$$

Likewise, in a same way, the maximum network packet throughput of the INC is:

$$\hat{\Gamma}' = \sum_t \sum_{c \in [1,C]} \gamma'_{t,c}. \quad \text{(Eq. 8)}$$

Further, $\Gamma$ and $\Gamma'$ are defined as the actual packet throughput for the own network respectively INC.

By the invention, the overall network throughput of all the network in maximised, both the own network as the INC, by choosing the actions A as optimally possible for all channel-time pairs for all the nodes n in the own network. The overall network throughput of the superframe is defined as:

$$F(\alpha) = \alpha\Gamma + (1-\alpha)\Gamma' \text{ with } \alpha \in [0,1] \quad \text{(Eq. 9)},$$

where $\alpha$ denotes the relative priority between the own network and the INC.

To increase the throughput $\alpha$ and $\alpha'$, either the amount of transmissions (TX/RX actions) is increased, more data is generated, or the number of collisions is decreased between the INC and the own network. Since there is no control about the data generation and only control of the nodes 100-105 respectively 200-206 in the own network, the throughput is increased by reducing the collisions.

Parameter $\omega_{t,c}$, is defined to be one if there was a potential collision between the INC and the own network at the slot time t on channel c, and $\Omega$ is the total of potential collisions:

$$\omega_{t,c} = \begin{cases} 0 \text{ if } \sum_{n \in [1,N]} TX_{t,c}^n + P_{t,c} \leq 1 \\ 1 \text{ otherwise} \end{cases}, \quad \text{(Eq. 10)}$$

$$\Omega = \sum_t \sum_{c \in [1,C]} \omega_{t,c}. \quad \text{(Eq. 11)}$$

By Eq. 4 it can be assumed that there will be no collisions in the own network thus to maximise $F(\alpha)$, $\Omega$ needs to be minimised. Furthermore, every node n can measure energy on all c channels based on hardware technologies such as software defined radios, SDRs.

Further, parameter $o_{t,c}^n \in [0,1]$ is defined as the observation made at time t on channel c for node n. Parameter $o_{t,c}^n=1$ if the amount of energy detected on channel c on time t for node n is too high for receiving another packet. Parameter $o_{t,c}^n=0$ if there is no energy or a small amount detected on the channel and there would be no influence to receive packets successfully. All the energy is detected, also energy generated by the node itself or neighbouring nodes of the own network.

Each node comprises network information and statistics, this is, a node knows if a current slot is allocated inside the own network where $TX_{t,c}=1$ if slot at time t on channel c will be used by any node in the own network as described in Eq. 12 below. This may, for example, be implemented by Request-to-Send/Clear-to-Send, RTS/CTS, strategies. Further, each node knows if packets are received correctly $\zeta_{t,c}^n=1$ when $RX_{t,c}^n=1$ and node n received a packet correctly at time t on channel c:

$$TX_{t,c} = \bigvee_{n \in [1,N]} TX_{t,c}^n. \quad \text{(Eq. 12)}$$

Figure 10:
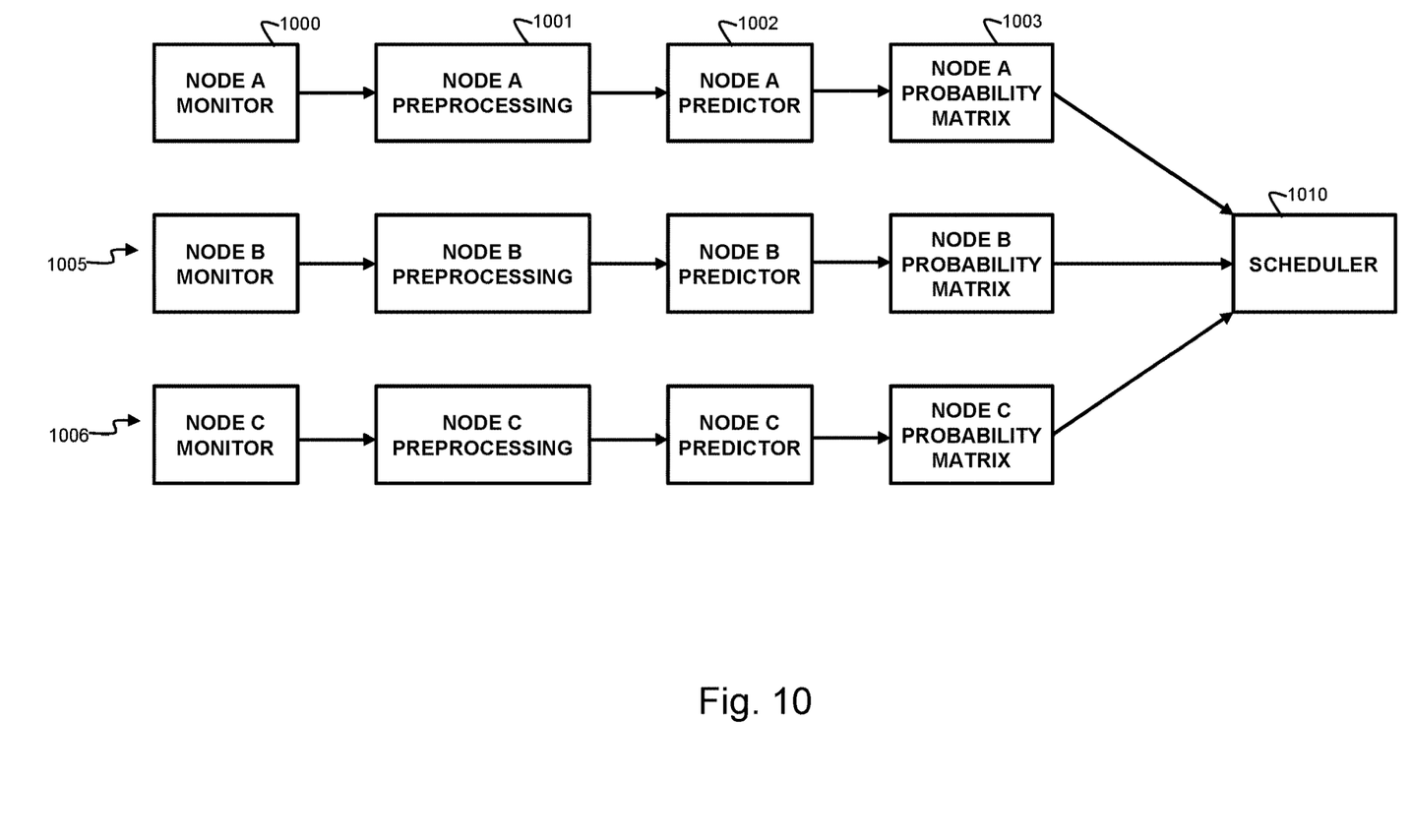
FIG. 10 shows an example embodiment an architecture of an algorithm of the invention for an own network comprising three nodes.

As illustrated in FIG. 10, the approach of the invention comprises five components: a spectrum monitor 1000, a pre-processing unit 1001, a predictor unit 1002, a probability matrix on the nodes 1003 and an overall, either centralised or decentralised, scheduler 1010. The components are present for each of the nodes, for example a node A, a node B 1005 and a node C 1006. The components will now be further discussed with reference to node A.

The spectrum monitor 1000 captures the energy of the overall spectrum. The captured spectrum monitor 100 information is forwarded to the pre-processing unit 1001. The pre-processing unit 1001 of node A creates the correct observation values $O_{t,c}^n$, together with the network schedule $TX_{t,c}$, the node schedule $A_{t,c}^n$, and success information $\zeta_{t,c}^n$ for node A, and all t in the last superframe on each channel c.

For every superframe, the predictor unit 1002 predicts the upcoming spectrum usage that will be generated by the INC. Parameter $p_{t,c}^n$ is defined as the result of the prediction unit 1002 where $p_{t,c}^n \in [0,1]$ which describes if the slot will be predicted as highly used—a value close to zero—or will be predicted as free—a value close to one. Parameters $p_{t,c}^n$ are called values of a probability matrix. The probability matrix 1003 is used by the scheduler 1010 to select slots that would be free to avoid collisions. Since the scheduler 1010 can be a centralised or decentralised MF-TDMA scheduler, or a slotted CSMA AP that will define when nodes could transmit. This can be realised in a MF-TDMA network where a sender node makes a request for slots to the receiver, the receiver replies with a best available slot based on the prediction.

Thus, the predictor unit 1002 predicts the used slots in an upcoming superframe used by the INC. These predictions could be used as an action by the scheduler 1010 to select slots. The prediction is defined as $\pi_t^n(O^n, TX): \mathbb{R}^{H \times S \times C}, \{0,1\}^{H \times S \times C} \mapsto \mathbb{R}^{S \times C}$ as the policy, predicted by the prediction unit 1002 of node A at time t based on the observation matrix $O^n$ and the schedule matrix TX where H defines a number of history frames. Additionally, $\pi^{*n}(O^n, TX)$ is defined as the theoretically optimal policy.

The problem may further be modelled as a reinforcement learning, RL, problem, wherein the order of slots is the action space. This way, the scheduler 1010 may decided how many slots will be selected to deliver a correct amount of packets to a correct destination and can select slots in a given order. The problem is described by using a continuous action space representing a stochastic game with continuous action space thereby avoiding a large amount of possible actions. The problem is further solved by combining supervised learning with RL techniques for solving it. Therefore, three components are described, namely a state, a label and loss function, and a neural network, NN.

The state or input features represents that state of the environment in the last H superframes. A state is described as $[O^n, TX]$, where $O^n \in \mathbb{R}^{H \times S \times C}$, where each element in the matrix corresponds to $o_{t,c}^n$ respectively, and the network schedule information $TX \in \{0,1\}^{H \times S \times C}$ where each element in the matrix corresponds to $TX_{t,c}^n$ respectively. By using this representation, it may be indicated when observations could be used to recognise patterns. If $TX_{t,c}=1$, a node is using the spectrum at time t in channel c, implying that the observation $O_{t,c}^n$ may comprise energy from a node in the network and may give a wrong impression about the patterns to be recognised.

Further to construct a label, a slot is defined as usable, unusable, or unknown. Therefore, $\phi$ is defined as a noise threshold. Usable and unusable slots are defined in Eq. 13 and Eq. 14:

$$\text{Usable}_{t,c}^n = o_{t,c}^n < \phi \vee \zeta_{t,c}^n \quad \text{(Eq. 13)},$$

$$\text{Unusable}_{t,c}^n = \neg \text{Usable}_{t,c}^n (\neg TX_{t,c} \vee RX_{t,c}^n) \quad \text{(Eq. 14)}.$$

In other words, in Eq. 13 usable slots are slots where the amount of energy detected is lower than the noise threshold $\phi$ or if there was a successful transmission. Otherwise, as stated in Eq. 14, if a slot is not usable and not part of the overall schedule but may be part of the own node receiving schedule, a slot is defined as unusable. The slots in the superframe that are not part of the set usable or unusable are labelled as unknown, or not labelled at all.

The loss is further described in Eq. 15:

$$\mathcal{L} = -\frac{\sum_{t,c}\left[\text{Usable}_{t,c}^n \log(\pi_{t,c}^n) + \text{Unusable}_{t,c}^n \log(1 - \pi_{t,c}^n)\right]}{\sum_{t,c}\left[\text{Usable}_{t,c}^n + \text{Unusable}_{t,c}^n\right]}, \quad \text{(Eq. 15)}$$

where a cross entropy loss with usable and unusable labels is calculated and divided by the number of slots that may be updated. The loss of unknown slots will be zero, and the NN will try to keep the output values of these slots. To make sure that every sample used for training is as important as all the others, the cross entropy is divided by the number of slots that may be updated. This way, it is prevented that the NN finds a way to start using all slots to decrease the loss by labelling as many slots as possible as unknown.

The NN is used to optimise the prediction. As an illustrative embodiment, a NN may be used comprising eight fully connected layers with for each layer $$S \times C \times \frac{(8-l)H}{8} \times 2 \text{ neurons,}$$

where l is the number of the layer between [1,8]. A swish activation function on each layer may be used, except for the last output layer, where a softmax activation is applied. Further, because data generation, schedule policies, network topologies, and the environment that may change drastically, online learning is preferred. After every $\delta$ steps, a training step is executed where at random samples out of the replay buffer are selected. To optimise the weights in the NN, a RMSProp optimiser may be used. As an illustrative example, the following hyperparameter values may be used:

TABLE 1

| Hyperparameter | Value |
|---|---|
| Minibatch size | 256 |
| Optimiser | RMPSProp |
| RMSProp momentum | 0 |
| RMSProp ϵ | $10^{-10}$ |
| RMSProp decay | 0.9 |
| Learning rate | $10^{-10-4}$ |
| Experience replay buffer size | 20,000 |
| δ | 10 |

Besides different topologies, as illustrated in FIG. 1 and FIG. 2, different approaches for communication between the nodes 100-105 respectively 200-206 may be implemented. As illustrative embodiments, five approaches may be distinguished. A regular approach is used in most systems. In order to reach a high throughput, the regular approach uses all free slots in the internal schedule by the scheduler 1010. In other words, it uses only a traditional MF-TDMA schedule algorithm or CSMA strategy without having collisions in the own network. Secondly, no sending is an extreme approach where the own network will not send any packet at all. This is an extreme case but illustrates an optimal performance of the INC 110-111 respectively 210-211. Fourthly, an optimal approach is the hypothetical best solution to solve the problem when α=0.5. In the optimal approach the own network knows behaviour of the INC upfront, which is not possible in real cases. Lastly, in a deep Q-network, DQN, approach each node of the nodes 100-105 respectively 200-206 uses a DQN, wherein, as an illustrative embodiment, a superframe of size one is used. Finally, the fifth approach is the approach as solved by the invention and which is nominated as the prediction approach.

Figure 3:
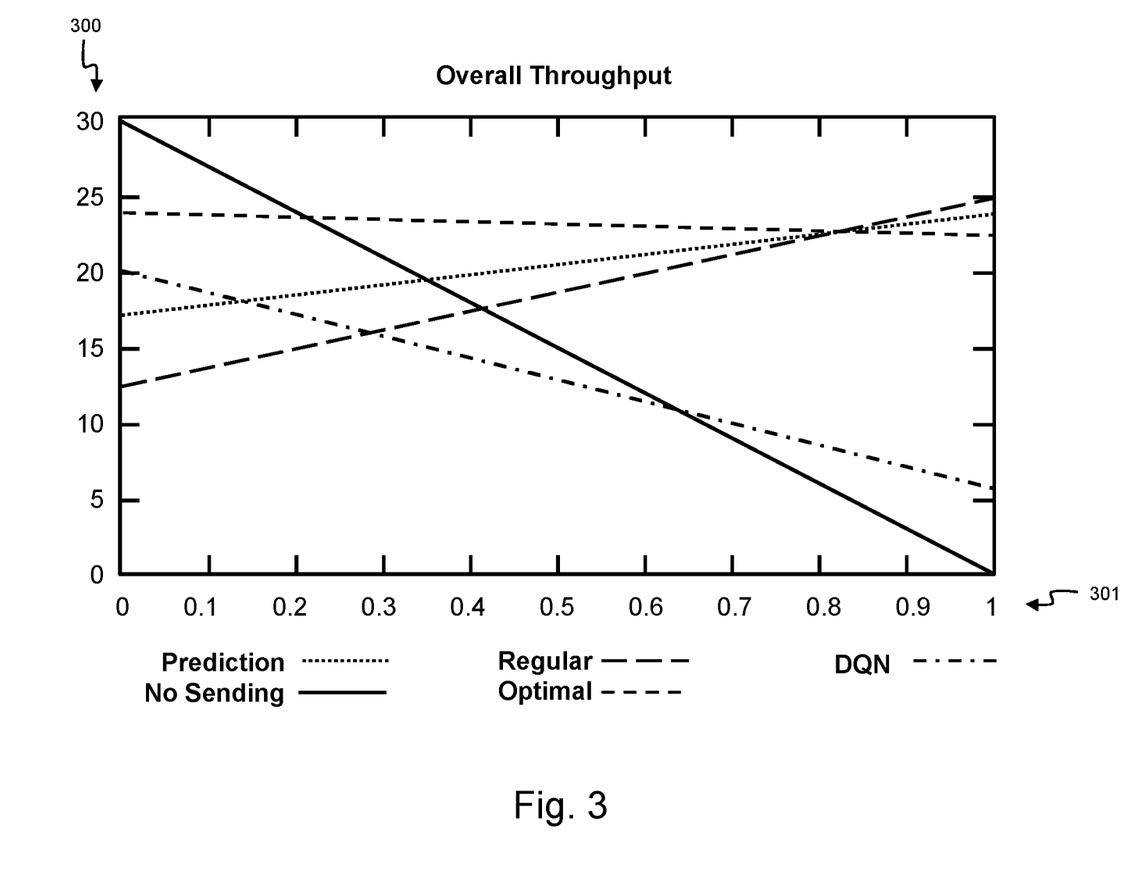
FIG. 3 shows an average overall throughput of a superframe in a multiple frequencies time division multiple access, MF-TDMA, mesh network and interfering networks cluster, INC, for different scheduling approaches.

In FIG. 3 the average overall throughput F (α) 300 of a superframe is illustrated for the topology of FIG. 1. It is observed that in the no sending approach, the overall throughput decreases with increasing α 301. On the other hand, in the regular approach the overall throughput increases with increasing α 301. The no sending and regular approach are the two most extreme approaches to indicate the performance of the INC and the own network. Further, as illustrated, the DQN approach underperforms, while the prediction approach by the invention is performing at least as good as the regular approach, when α<0.8, or the optimal approach, when α>0.8.

Figure 4:
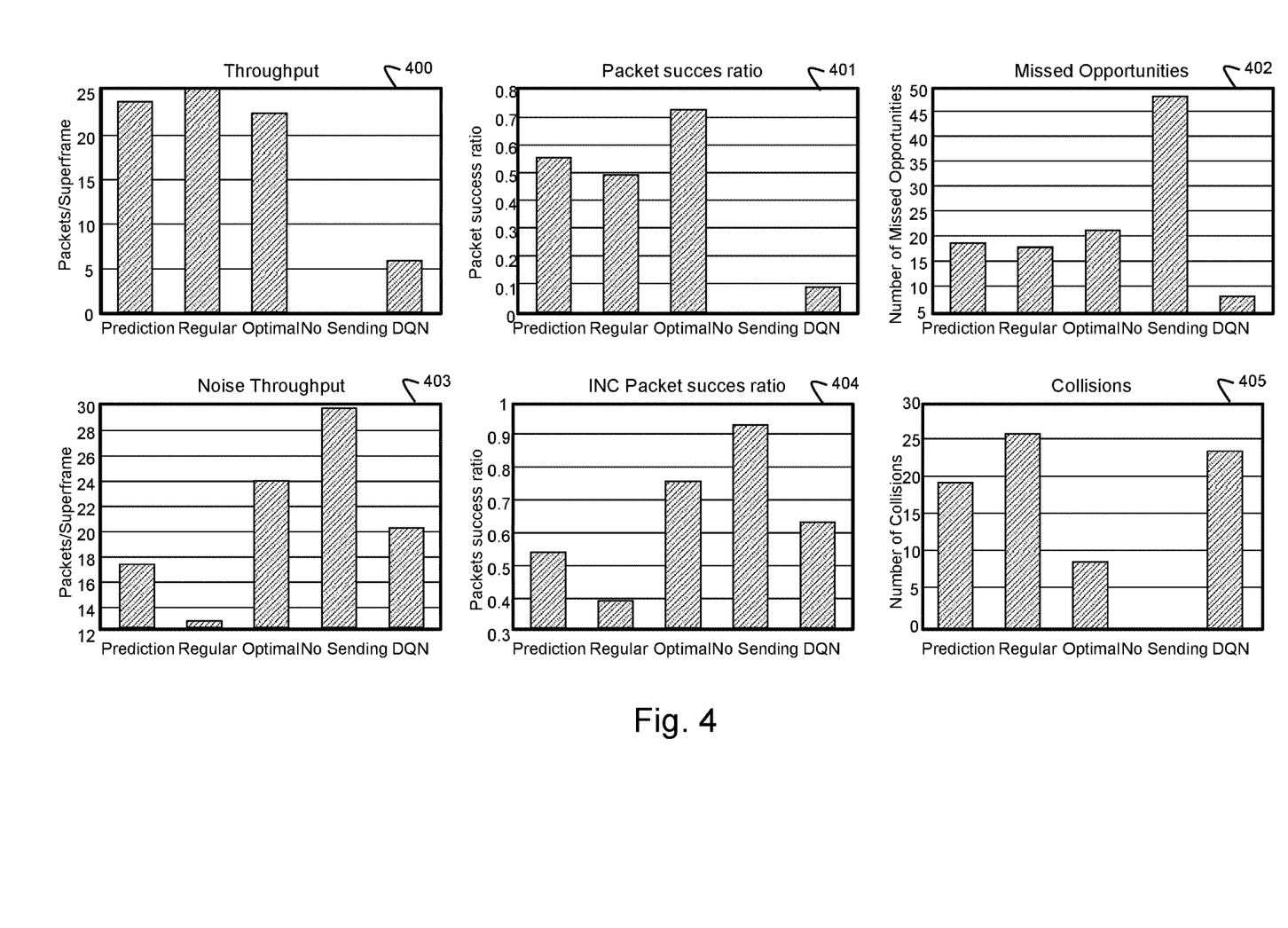
FIG. 4 shows network metrics of a superframe in a network for different scheduling approaches in an MF-TDMA mesh network.

Further, in FIG. 4 different network metrics of the superframe in the network for the different scheduling approaches in the MF-TDMA mesh network are illustrated. In 405 it is illustrated that the prediction approach of the invention reduces the average number of collisions for each superframe with 30% in comparison with the regular scheduling approach. Further, in 400 the throughput is illustrated, in 401 packet success ratio is illustrated, in 402 missed opportunities is illustrated, in 403 noise throughput is illustrated, and in 404 INC packet success ratio is illustrated. It is observed that the prediction approach of the invention is always between the performance of the regular approach and the optimal approach. Since the prediction approach is less aggressive than the regular approach, the throughput is reduced a bit. This leads to less collisions if the module predicts a false positive.

Figure 5:
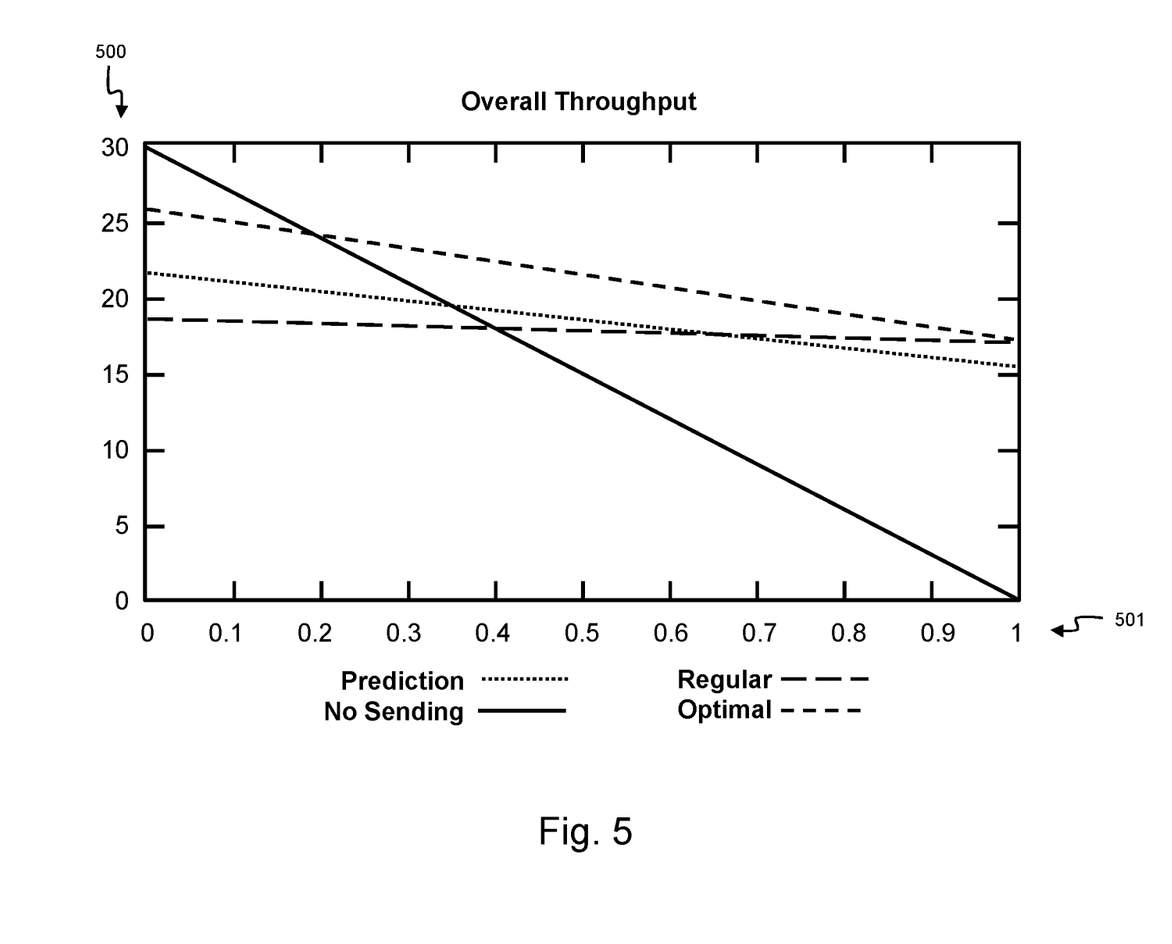
FIG. 5 shows an average overall throughput of a superframe in a MF-TDMA AP network and INC for different scheduling approaches.
Figure 6:
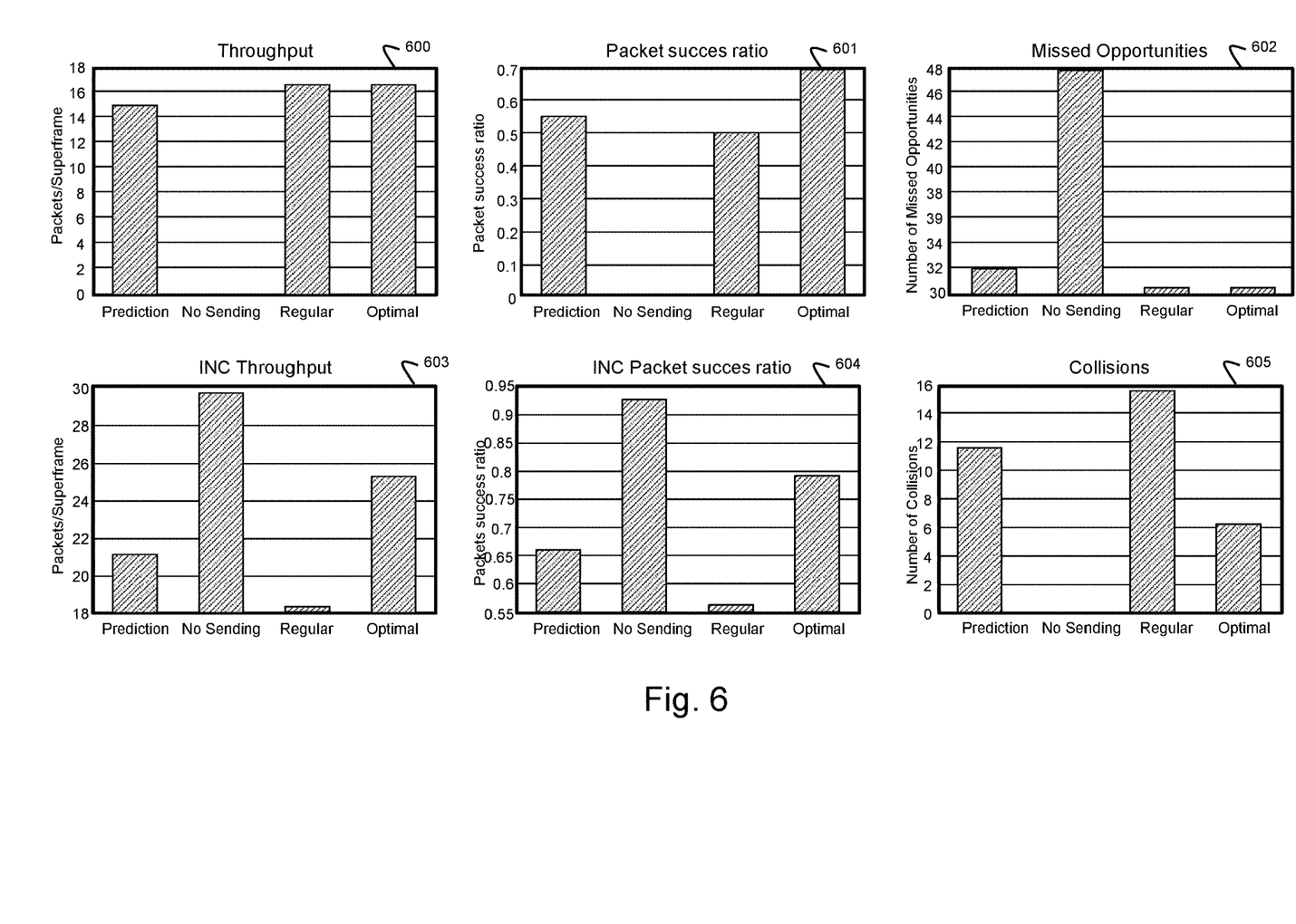
FIG. 6 shows network metrics of a superframe in a network for different scheduling approaches in an MF-TDMA AP network.

In FIG. 5 the average overall throughput F(α) 300 of a superframe is illustrated for the topology of FIG. 2. In this topology the prediction approach outer performs the regular approach when α<0.7. Further, the number of collisions is reduced with a factor 1.3, which is illustrated in FIG. 6 reference 605. FIG. 6 illustrates network metrics of the superframe in the network for the different scheduling approaches in the MF-TDMA AP network of FIG. 2. The throughput 600 of the own network is similar and the throughput 600 of the INC is increased with a factor 1.17 as illustrated in 600. In FIG. 6 the metrics packet success ratio 601, missed opportunities 602, INC throughput 603 and INC Packet success ratio 604 are further illustrated.

Figure 7:
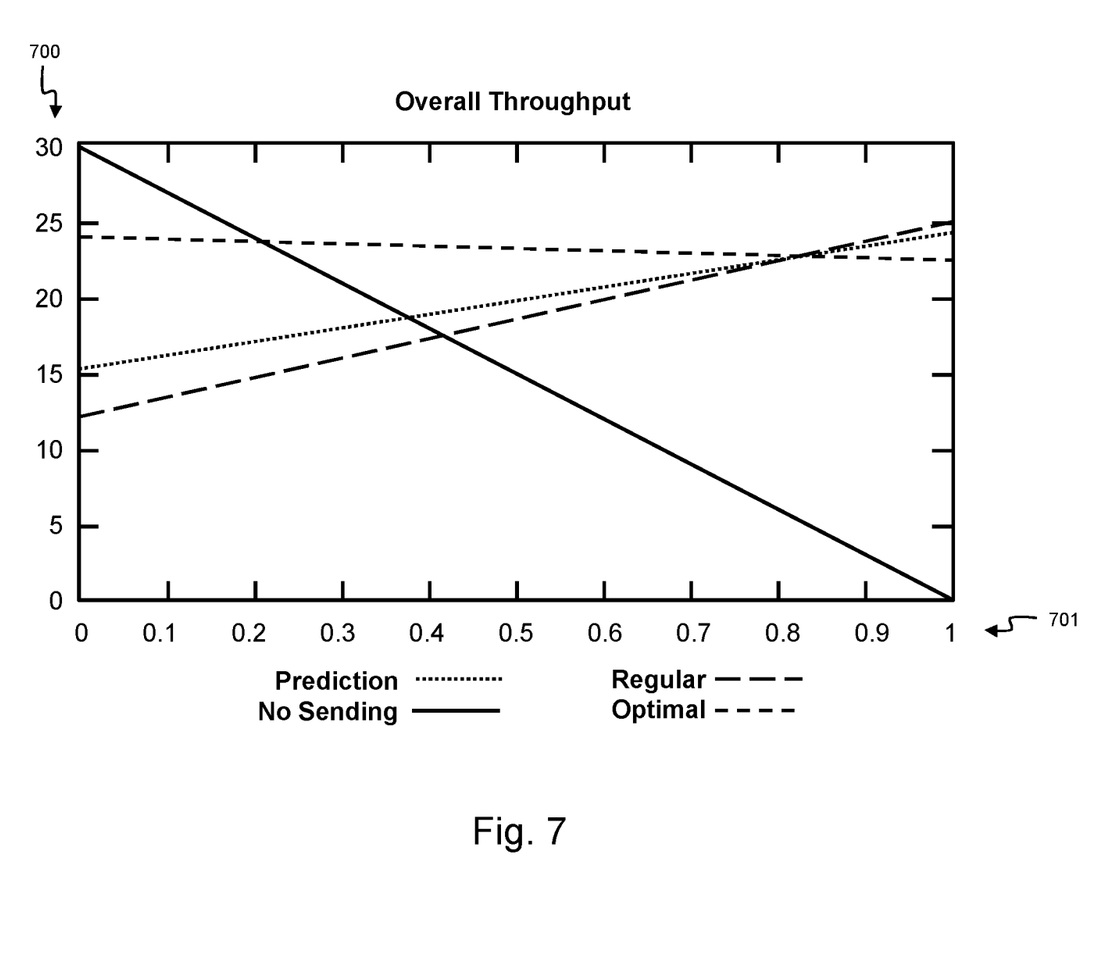
FIG. 7 shows an average overall throughput of a superframe in a carrier sense multiple access, CSMA, AP network and INC for different scheduling approaches.
Figure 8:
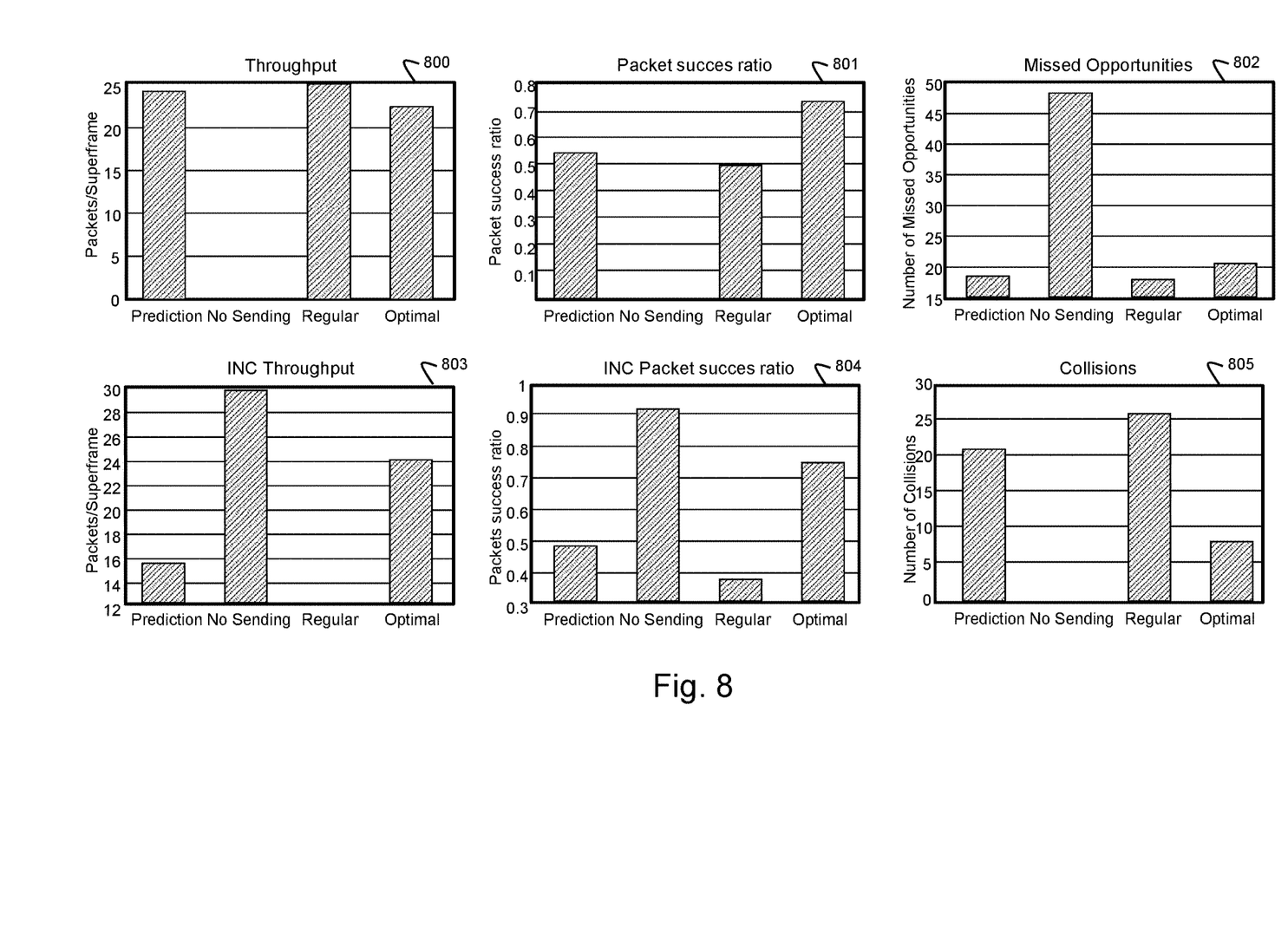
FIG. 8 shows network metrics of a superframe in a network for different scheduling approaches in an CSMA AP network.

In FIG. 7 the average overall throughput F(α) 300 of a superframe is illustrated for a CSMA AP topology. In FIG. 8 network metrics related to this topology are illustrated.

Figure 9:
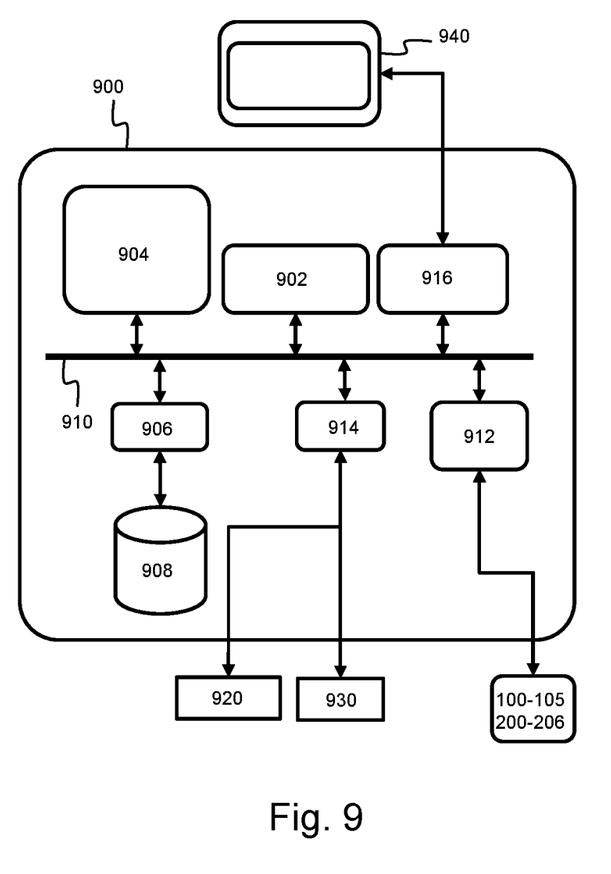
FIG. 9 shows an example embodiment of a suitable computing system 900 for performing one or several steps in embodiments of the invention.

FIG. 9 shows a suitable computing system 900 enabling to implement embodiments of the method for predicting a radio spectrum usage in an environment according to the invention. Computing system 900 may in general be formed as a suitable general-purpose computer and comprise a bus 910, a processor 902, a local memory 904, one or more optional input interfaces 914, one or more optional output interfaces 916, a communication interface 912, a storage element interface 906, and one or more storage elements 908. Bus 910 may comprise one or more conductors that permit communication among the components of the computing system 900. Processor 902 may include any type of conventional processor or microprocessor that interprets and executes programming instructions. Local memory 904 may include a random-access memory (RAM) or another type of dynamic storage device that stores information and instructions for execution by processor 902 and/or a read only memory (ROM) or another type of static storage device that stores static information and instructions for use by processor 902. Input interface 914 may comprise one or more conventional mechanisms that permit an operator or user to input information to the computing device 900, such as a keyboard 920, a mouse 930, a pen, voice recognition and/or biometric mechanisms, a camera, etc. Output interface 916 may comprise one or more conventional mechanisms that output information to the operator or user, such as a display 940, etc. Communication interface 912 may comprise any transceiver-like mechanism such as for example one or more Ethernet interfaces that enables computing system 900 to communicate with other devices and/or systems, for example with other one or more of the nodes 100-105 or 200-206. The communication interface 912 of computing system 900 may be connected to such another computing system by means of a local area network (LAN) or a wide area network (WAN) such as for example the internet. Storage element interface 906 may comprise a storage interface such as for example a Serial Advanced Technology Attachment (SATA) interface or a Small Computer System Interface (SCSI) for connecting bus 910 to one or more storage elements 908, such as one or more local disks, for example SATA disk drives, and control the reading and writing of data to and/or from these storage elements 908. Although the storage element(s) 908 above is/are described as a local disk, in general any other suitable computer-readable media such as a removable magnetic disk, optical storage media such as a CD or DVD, -ROM disk, solid state drives, flash memory cards, . . . could be used. Computing system 900 could thus correspond to a node in the embodiments illustrated by FIG. 1 or FIG. 2.

As used in this application, the term "circuitry" may refer to one or more or all of the following:
  (a) hardware-only circuit implementations such as implementations in only analog and/or digital circuitry and
  (b) combinations of hardware circuits and software, such as (as applicable):

(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer implemented method for obtaining a neural network for predicting usage of a radio spectrum in an environment comprising interferers and a plurality of wireless nodes, the wireless nodes operating via a slotted medium access control, MAC, protocol within the radio spectrum, the method comprising the following steps:
   obtaining per slot usage of the radio spectrum by sensing the radio spectrum;
   labelling the slots as:
   usable when a respective radio spectrum usage is lower than a predefined noise threshold or when a node successfully transmitted a packet through it;
   unusable when the slot is not labelled as usable but the slot is suitable to receive a packet according to the MAC protocol; and
   calculating a loss function as a cross entropy loss with the usable and unusable slots over a total number of usable and unusable slots for a certain prediction; and
   training the neural network to predict usable and unusable slots by minimizing the loss function.

2. The computer implemented method according to claim 1, further comprising the step of:
   optimizing layers of the neural network.

3. The computer implemented method according to claim 2, wherein the optimizing further comprises:
   optimizing an output layer of the neural network by a softmax activation.

4. The computer implemented method according to claim 1, further comprising the step of:
   predicting by the neural network an upcoming radio spectrum usage of the interferers.

5. The computer implemented method according to claim 1, wherein the slotted MAC protocol is a time division multiple access, TDMA, protocol, a multiple frequencies time division multiple access, MF-TDMA protocol, or a slotted carrier sense multiple access, CSMA, protocol.

6. The computer implemented method according to claim 1, wherein the sensing is performed by a software defined radio, SDR, platform.

7. A neural network for predicting usage of a radio spectrum in an environment comprising interferers and a plurality of wireless nodes obtained by the computer implemented method according to claim 1.

8. A computing system comprising means for carrying out the method according to claim 1.

9. A computer program product comprising computer-instructions stored on a non-transitory computer-readable medium for performing the method according to claim 1 when the program is run on a computer.

10. A computer readable storage medium comprising the computer program product according to claim 9.

11. A wireless communication node configured to operate by a slotted medium access control, MAC, protocol within a radio spectrum;
   wherein the wireless node is further configured to predict available slots by the neural network according to claim 7.

* * * * *